(12) United States Patent
Yumoto et al.

(10) Patent No.: US 7,027,881 B2
(45) Date of Patent: Apr. 11, 2006

(54) REMOTE CONTROL SYSTEM, ELECTRONIC DEVICE, AND PROGRAM

(75) Inventors: Takayuki Yumoto, Tokyo (JP); Hiroto Narioka, Kanagawa (JP)

(73) Assignee: Sony Corporation, Tokyo (JP)

( * ) Notice: Subject to any disclaimer, the term of this patent is extended or adjusted under 35 U.S.C. 154(b) by 432 days.

(21) Appl. No.: 10/282,494

(22) Filed: Oct. 29, 2002

(65) Prior Publication Data

US 2003/0080874 A1    May 1, 2003

(30) Foreign Application Priority Data

Oct. 31, 2001  (JP) .............................. 2001-334898

(51) Int. Cl.
*G05B 19/18* (2006.01)

(52) U.S. Cl. .............................. 700/65; 700/9; 700/17; 700/168; 700/83; 700/28; 715/700; 715/740; 715/742; 715/748

(58) Field of Classification Search ................ 700/65, 700/9, 17, 168, 83, 28; 715/700, 740, 742, 715/748, 762, 864; 345/169, 172, 173, 179, 345/3.4
See application file for complete search history.

(56) References Cited

U.S. PATENT DOCUMENTS

| | | | | |
|---|---|---|---|---|
| 5,671,267 A | * | 9/1997 | August et al. ............... | 455/420 |
| 5,831,664 A | * | 11/1998 | Wharton et al. ............... | 725/81 |
| 5,909,183 A | * | 6/1999 | Borgstahl et al. ...... | 340/825.22 |
| 5,920,308 A | * | 7/1999 | Kim ............................ | 345/169 |
| 6,020,881 A | * | 2/2000 | Naughton et al. .......... | 715/740 |
| 6,040,829 A | * | 3/2000 | Croy et al. ................. | 715/864 |
| 6,195,589 B1 | * | 2/2001 | Ketcham ..................... | 700/28 |
| 6,211,856 B1 | * | 4/2001 | Choi et al. .................. | 345/666 |
| 6,408,435 B1 | * | 6/2002 | Sato ............................ | 725/58 |
| 6,437,836 B1 | * | 8/2002 | Huang et al. ............... | 348/734 |

FOREIGN PATENT DOCUMENTS

| | | |
|---|---|---|
| JP | 2000-236585 | 8/2000 |
| JP | 2000-244989 | 8/2000 |
| JP | 2001-144781 | 5/2001 |
| JP | 2001-256156 | 9/2001 |

* cited by examiner

*Primary Examiner*—Anthony Knight
*Assistant Examiner*—Thomas Pham
(74) *Attorney, Agent, or Firm*—Robert J. Depke; Trexler, Bushnell, Giangiorgi, Blackstone & Marr, Ltd.

(57) ABSTRACT

A remote control system is constructed from a simple device configuration in which a device like a relay is not used. A higher degree of flexibility is provided to types of devices to be controlled which can be remotely controlled, and a control device which performs remote control. ABILITY information indicating the ability of an input operation function of the control device is transmitted from the control device to the device to be controlled. The device to be controlled creates conversion-into-remote-controller data on the basis of this ability information and transmits the data to the control device. Then, the control device creates a GUI by using the received conversion-into-remote-controller data. As a result, an electronic device serving as a control device can function as a remote controller which remotely controls a specific device to be controlled.

13 Claims, 8 Drawing Sheets

REMOTE CONTROL SYSTEM, ELECTRONIC DEVICE, AND PROGRAM

This application claims priority to Japanese Patent Application Number JP2001-334898 filed Oct. 31, 2001, which is incorporated herein by reference.

BACKGROUND OF THE INVENTION

1. Field of the Invention

The present invention relates to a remote control system constructed in such a manner that an electronic device serving as a control device can control an electronic device serving as a device to be controlled, to electronic devices serving as a control device and a device to be controlled which form this remote control system, and to a program which is executed by these electronic devices.

2. Description of the Related Art

In recent years, portable-type cordless telephones such as cellular phones or PHS (Personal Handyphone System) have come into wide use. Against such a background, at the current situation, various technologies in which this cordless telephone is made to function as a remote controller in order to allow electronic devices to be controlled have been proposed.

As an example, in a patent application (example 1) which is made public as Japanese Unexamined Patent Application Publication No. 6-164747, a configuration in which a wireless phone and a cellular phone are provided to remotely control a video cassette recorder is disclosed. In this configuration, when an operation for controlling the video cassette recorder is performed on the cellular phone, this operation information is transmitted to the wireless phone in a wireless manner. The wireless phone has a video control signal transmission section for transmitting a command to the video cassette recorder by using an infrared signal. In response to the reception of the operation information transmitted in the above-described manner, the wireless phone wirelessly transmits a command as an infrared signal to the video cassette recorder from the video control signal transmission section. Then, in the video cassette recorder, an operation corresponding to the received command signal is performed.

Also, in a patent application (example 2) which is made public as Japanese Unexamined Patent Application Publication No. 9-153952, a configuration is disclosed in which, when operation information corresponding to the operation performed on a PHS terminal is wirelessly transmitted from this PHS terminal to the control device, the operation information command received by the control device is transmitted to a specified electronic device among various electronic devices.

More specifically, in the inventions of these examples 1 and 2, a configuration is adopted in which operation information transmitted from a cordless phone possessed by a user is converted into a command by which a relay (wireless phone, control device) can control an electronic device to be controlled, and this command is transmitted.

Furthermore, in a patent application (example 3) which is made public as Japanese Unexamined Patent Application Publication No. 11-284757, the following remote control system has been proposed.

In this invention, assuming that a portable terminal is connected to a network via a base station, a server is provided as a central station on the network. Furthermore, a configuration in which a household VTR, which is an electronic device to be controlled, can also be connected to the network, is adopted.

Then, the portable terminal communicates with the central station from the base station over the network, thereby obtaining information of an electronic program guide from the central station, and displays it. The user performs a recording reservation operation while viewing this displayed electronic program guide. In the portable terminal, this recording reservation is transmitted from the base station to the VTR over the network. In the VTR, a recording reservation operation is performed by using the received recording reservation information.

In a patent application (example 4) as a Japanese Utility Patent Application Publication No. 7-8610, a configuration in which a plurality of types of devices can be controlled by one remote controller is disclosed.

However, in the remote control system disclosed, for example, by each of the above-described patent applications, examples 1 and 2 require that a user have a dedicated device for constructing a system having a function as a relay, such as a wireless phone or a control device. Furthermore, as long as a device serving as a relay exists, targets of devices which can be remotely controlled, and variations of operation are limited. Even if the number of devices to be remotely controlled is to be increased, for example, hardware and software need to be replaced with new ones. Therefore, it is difficult for an ordinary end user to expand them with ease.

In contrast, in the system of example 3, for the connection between the portable terminal and the VTR, a network is provided therein only. Therefore, although it is not necessary for the user to have a device like a relay, only by accessing the server on the network, information of the electronic program guide, which is a GUI (Graphical User Interface), for a recording reservation operation, can be obtained.

Regarding expandability in example 3, also, variations of control devices capable of performing remote control and variations of operations depend on the contents of a database possessed by the central station which is a server. Therefore, the user's desire is not met, and the expansion cannot be said to be high at all.

For the remote controller disclosed in example 4, according to the described contents thereof, for example, a program is stored in a fixed manner so that a remote control operation corresponding to a specific device determined in advance as a control target (an air conditioner, illumination, a television receiver, a VTR, etc.) can be obtained. Therefore, this remote controller also does not have high expandability either. Also, as a device which performs an operation for remote control, in this case, for example, a dedicated remote controller is necessary. Therefore, this also lacks general-purpose characteristic as well.

SUMMARY OF THE INVENTION

Accordingly, in view of the above-described problems, an object of the present invention is to construct a remote control system from a device configuration as simple as possible in which, for example, a device having a relay-like function is not used, and to provide a higher degree of flexibility for types of devices which can be remotely controlled and control devices which perform remote control.

Therefore, the remote control system is constructed as described below.

The remote control system in accordance with a first aspect of the present invention comprises a control device and a device to be controlled which can communicate with the control device via a predetermined communication path.

The control device comprises input operation means capable of performing an input operation; ability information transmission means for transmitting ability information indicating ability of the input operation means to the device to be controlled; user interface forming means for forming user interface for receiving conversion-into-remote-controller information transmitted by the device to be controlled in response to the reception of the ability information and for operating the device to be controlled by using this received conversion-into-remote-controller information; and operation information transmission means for transmitting operation information corresponding to the operation performed on the input operation means to the device to be controlled in a state in which the user interface is formed.

The device to be controlled comprises conversion-into-remote-controller information creation means for creating, on the basis of the received ability information, the conversion-into-remote-controller information used to form the user interface which can be realized within the range of the ability of the input operation means; conversion-into-remote-controller information transmission means for transmitting the conversion-into-remote-controller information to the control device; and operation control means for performing operation control in the device to be controlled so that a predetermined operation is performed in accordance with the received operation information.

The electronic device functioning as a control device in accordance with a second aspect of the present invention is constructed as described below.

The electronic device comprises communication means capable of communicating with another electronic device to be controlled by the electronic device via a predetermined communication path; input operation means capable of performing an input operation; ability information transmission means for transmitting, by using the communication means, ability information indicating ability of the input operation means to the device to be controlled; user interface forming means for forming a user interface for operating the device to be controlled by using conversion-into-remote-controller information, which is transmitted by the device to be controlled in response to the reception of the ability information, for forming a user interface which can be realized within the range of ability of the input operation means when the information is received by the communication means; and operation information transmission means for transmitting, by using the communication means, the operation information corresponding to the operation performed on the input operation means to the device to be controlled in a state in which the user interface is formed.

The program to be executed by the electronic device functioning as a control device in accordance with a third aspect of the present invention is structured as described below.

The program causes an electronic device serving as a control device to execute a communication step in which communication with an electronic device to be controlled, which is a control target, via a predetermined communication path is possible; an ability information transmission step in which ability information indicating the ability of an input operation function possessed by the electronic device is transmitted to the device to be controlled in the communication step; a user interface forming step of forming a user interface for operating the device to be controlled by using conversion-into-remote-controller information, which is transmitted by the device to be controlled in response to the reception of the ability information, for forming a user interface which can be realized within the ability range of the operation information function, when this information is received; and an operation information transmission step of transmitting, in the transmission step, operation information corresponding to the input operation performed in a state in which the user interface is formed.

The electronic device functioning as a device to be controlled in accordance with a fourth aspect of the present invention is constructed as described below.

The electronic device comprises communication means capable of communicating with a controlling electronic device for which the electronic device is a control target via a predetermined communication path; conversion-into-remote-controller information creation means for creating conversion-into-remote-controller information for forming a user interface which can be realized within the ability range of the operation information function on the basis of ability information, received by the communication means, indicating the ability of operation information means of the controlling electronic device; conversion-into-remote-controller information transmission means for transmitting the conversion-into-remote-controller information to the controlling electronic device by using the communication means; and operation control means for performing operation control in the electronic device so that a predetermined operation is performed in such a manner as to correspond to operation information, which is transmitted by the controlling electronic device in response to the input operation performed on the input operation means under the user interface formed using the conversion-into-remote-controller information, when this information is received by the communication means.

The program to be executed by the electronic device functioning as a device to be controlled in accordance with a fifth aspect of the present invention is structured as described below.

The program causes an electronic device functioning as a control device to be controlled to execute a communication step in which communication with a controlling electronic device for which another electronic device is a control target is possible via a predetermined communication path; a conversion-into-remote-controller information creation step for creating conversion-into-remote-control information for forming a user interface which can be realized within the ability range of the operation information function on the basis of ability information, which is received in the communication step, indicating the ability of operation information means of the controlling electronic device; a conversion-into-remote-controller information transmission step of transmitting the conversion-into-remote-controller information to the controlling electronic device in the communication step; and an operation control step of performing operation control in the electronic device so that a predetermined operation is performed in such a manner as to correspond to operation information, which is transmitted by the controlling electronic device in response to the input operation performed under the user interface formed using the conversion-into-remote-controller information, when this information is received in the communication step.

With the above-described arrangement, the control device transmits ability information indicating the ability of the input operation means of the control device to a device to be controlled. The device to be controlled transmits conversion-into-remote-controller information, which is data for converting the control device into a remote controller, on the basis of this ability information. Then, the control device forms user interface by using this conversion-into-remote-controller information. Then, when an operation for the input operation means is performed under this user interface, this operation information is transmitted from the control device to the device to be controlled, and the device to be controlled performs an operation corresponding to the operation information.

In the manner described above, in the present invention, ability information and conversion-into-remote-controller information are exchanged between the control device and the device to be controlled by using a communication path. As a result, it is possible to construct a remote control system in which a particular electronic device can remotely control another particular electronic device.

When applying each of the above-described aspects of the present invention, this can also be realized by, for example, an information processing method in accordance with the remote control system, the electronic device, and the program. Furthermore, this can also be realized by a recording medium in which the program according to the present invention is stored.

As has been described, in the present invention, ability information indicating the ability of the input operation function of the control device is transmitted from the control device to the device to be controlled. The device to be controlled creates conversion-into-remote-controller data on the basis of this ability information and transmits the data to the control device. Then, the control device creates a GUI by using the received conversion-into-remote-controller data. As a result, an electronic device serving as a control device can function as a remote controller for remotely controlling a specific device to be controlled.

With such an arrangement, even if, for example, a device which functions as, in particular, a relay is not provided, it becomes possible to construct a remote control system by a simple combination of devices made up of control devices and devices to be controlled, and a remote control system which is friendlier to users can be constructed.

Furthermore, according to the above-described configuration, since electronic devices serving as control devices and devices to be controlled are not fixedly limited to predetermined specific devices, the flexibility, such as types of devices, for the control devices and the devices to be controlled, becomes higher. As a result, for example, since the flexibility of the selection of devices when a remote control system is to be constructed becomes higher, it is possible for the user to construct a remote control system more easily, and the convenience of allowing various types of devices to function as control devices and devices to be controlled is improved.

DESCRIPTION OF THE PREFERRED EMBODIMENTS

Embodiments of the present invention will be described below.

The description given below will be provided in the following sequence.

Figure 1:
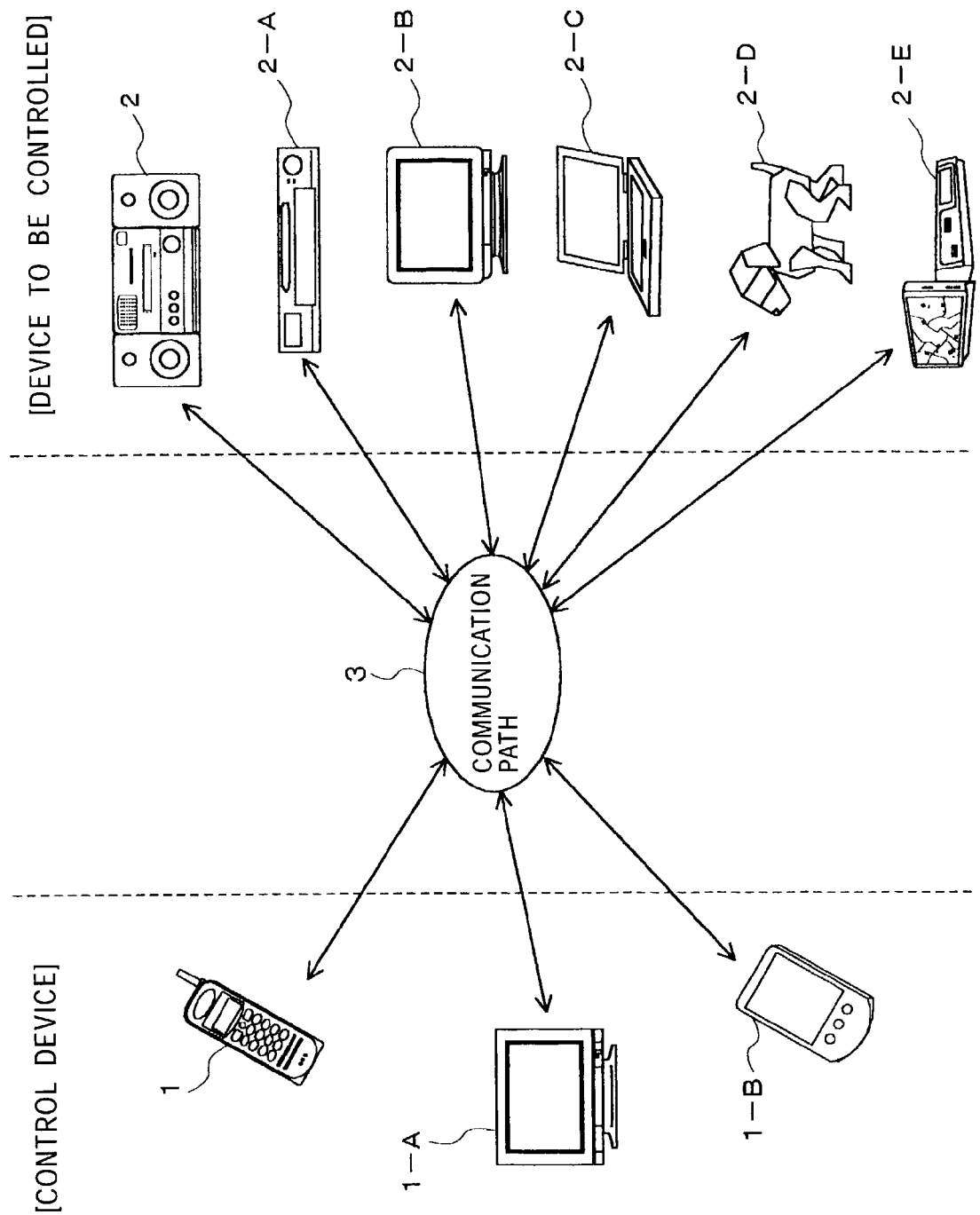
FIG. 1 is an illustration of an example of the configuration of a remote control system according to an embodiment of the present invention.

1. Example of system configuration
2. Example of system operation
2-1. Configuration of cellular phone (control device)
2-2. Configuration of audio component device (device to be controlled)
2-3. Conversion-into-remote-controller process
2-4. Remote-control performing process
1. Example of System Configuration FIG. 1 shows an example of the configuration of a remote control system according to an embodiment of the present invention. As shown in FIG. 1, the remote control system of this embodiment is constructed in such a manner that a control device on a side which performs remote control and a device to be controlled, which is a remote control target by this control device, are connected to each other via a predetermined communication path 3.

In the case of this embodiment, types of devices which can function as control devices are not particularly limited if these devices have the functions such as those described below. That is, it is only necessary that the device has ability which allows an input operation by a GUI as a result of being provided with a communication function capable of performing wireless communication in compliance with a communication protocol compatible with the communication path 3 and as a result of being provided with, for example, a display section and operation elements. Then, this device can function as a control device if a remote-controller application 24a which realizes the operation of the remote control system of this embodiment is stored, and operations in accordance with this program can be performed.

Accordingly, in FIG. 1, as examples of control devices, a cellular phone 1, a terminal device 1-A which is dedicated to a network, and a PDA (Personal Digital Assistant) 1-B are shown.

The cellular phone 1 in this case can be connected to the communication path 3 by, for example, wireless communication, and as is well known, a required operation can be performed on the GUI displayed on the display section by using operation keys provided in the main unit.

The network-dedicated terminal device 1-A is a terminal device which has, in a dedicated manner, functions for connection to a specific network via the communication path 3. For example, as representative ones of such a network-dedicated terminal device 1-A, devices which are connected to the Internet and which are formed to be dedicated to the Internet functions for creating, transmitting, and receiving electronic mail, and browsing Web sites are widely known. It is common that such a network-dedicated terminal device 1-A is also provided with a display section for allowing GUI operations, and it is sufficiently possible for the terminal device 1-A to function as a control device if a function capable of connection with the communication path 3 is provided.

It is common that, as is well known, the PDA 1-B is also provided with a display section for allowing GUI operations, and the PDA 1-B can become a control device as a result of being provided with a wireless communication function in compliance with a predetermined communication protocol.

As devices to be controlled for a remote control target, for example, any type of electronic device may be used as long as it performs a required operation, for example, in response to an input operation performed by a user.

In FIG. 1, as examples, an audio component device 2, a video recorder 2-A, a television receiver 2-B, a personal computer 2-C, a hobby robot 2-D, and a navigation device 2-E are shown. By providing such various electronic devices with a communication function as a communication path and by storing a remote-controller server program 38a for realizing the operation of the remote control system of this embodiment so that the operation in accordance with this program become possible, these devices can become devices to be controlled according to the embodiment of the present invention.

In the current situation, in addition to the Internet, examples of the communication path 3 of this embodiment include networks such as a LAN (Local Area Network) and a PAN (Personal Area Network) in compliance with a predetermined communication protocol. Examples of such networks include bluetooth, and wireless Ethernet defined by IEEE 802.11.

For the communication path 3 in this embodiment, only one specific network is not shown, and the communication path 3 needs to be configured so as to be formed of a plurality of networks depending on the system configuration.

Figure 2:
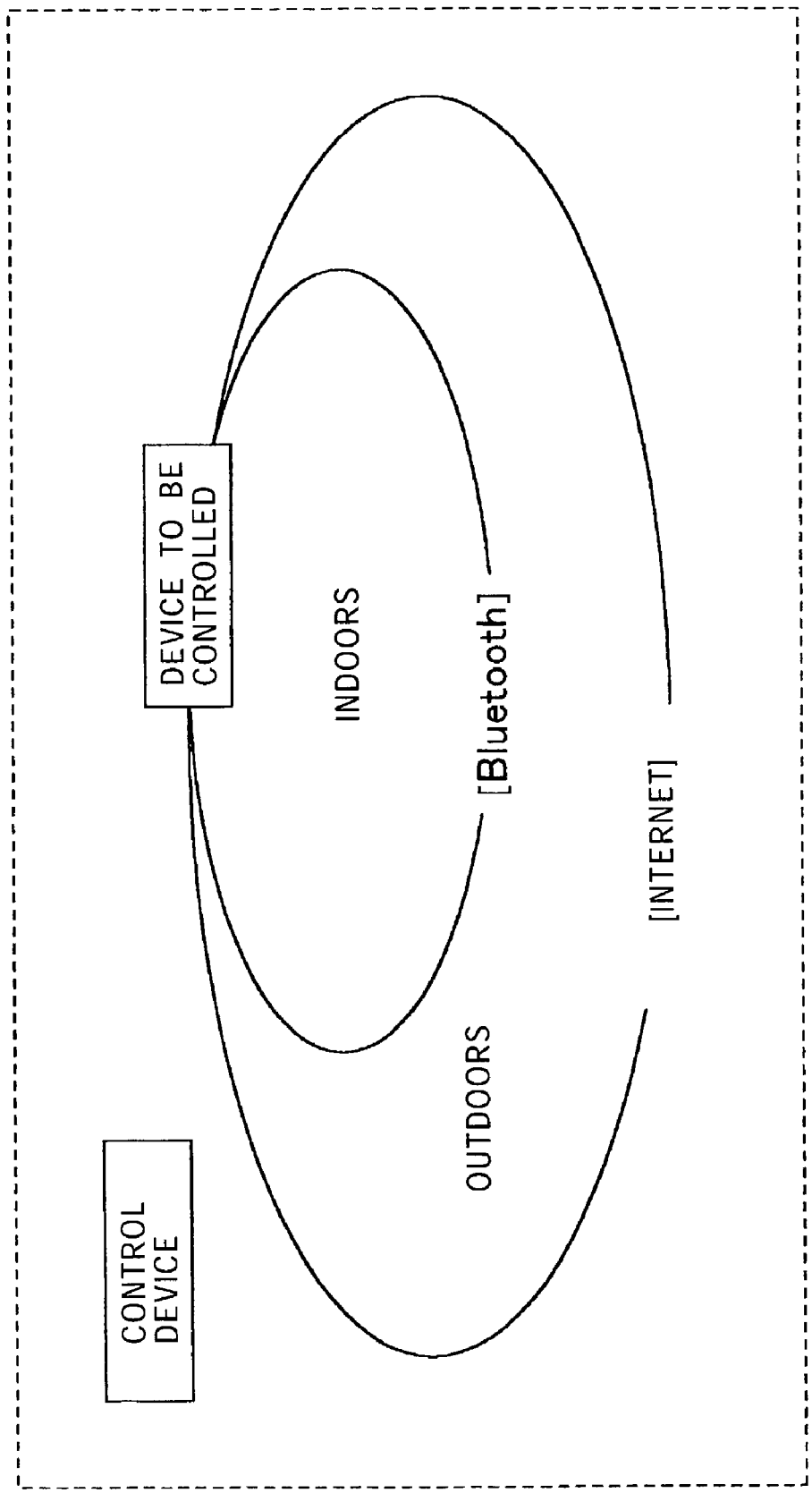
FIG. 2 is an illustration showing an example in which communication paths according to the embodiment of the present invention exist in a combined manner.

For example, as shown in FIG. 2, when the control device and the device to be controlled are present in the same indoors, the communication path 3 is formed by bluetooth. In a situation in which, for example, short-distance wireless communication is impossible because the device to be controlled is present indoors, whereas the control device is present outdoors, the Internet may be used as the communication path 3.

2. Example of System Operation 2-1. Configuration of Cellular Phone (Control Device)

Next, an example of specific operations of the remote control system according to the embodiment of the present invention will be described.

When providing the following description, the control device and the device to be controlled which form the system are assumed to be the cellular phone 1 and the audio component device 2, respectively among the devices shown in FIG. 1. Furthermore, as the communication path 3, a bluetooth communication network is used as an example. That is, the cellular phone 1, which is a control device, and the audio component device 2, which is a device to be controlled, according to this embodiment have implemented therein hardware and software capable of wireless communication in compliance with the bluetooth communication standard.

Accordingly, initially, each configuration of the cellular phone 1 and the audio component device 2 corresponding to the system configuration according to this embodiment will be described, and the cellular phone 1 will be described first.

Figure 3:
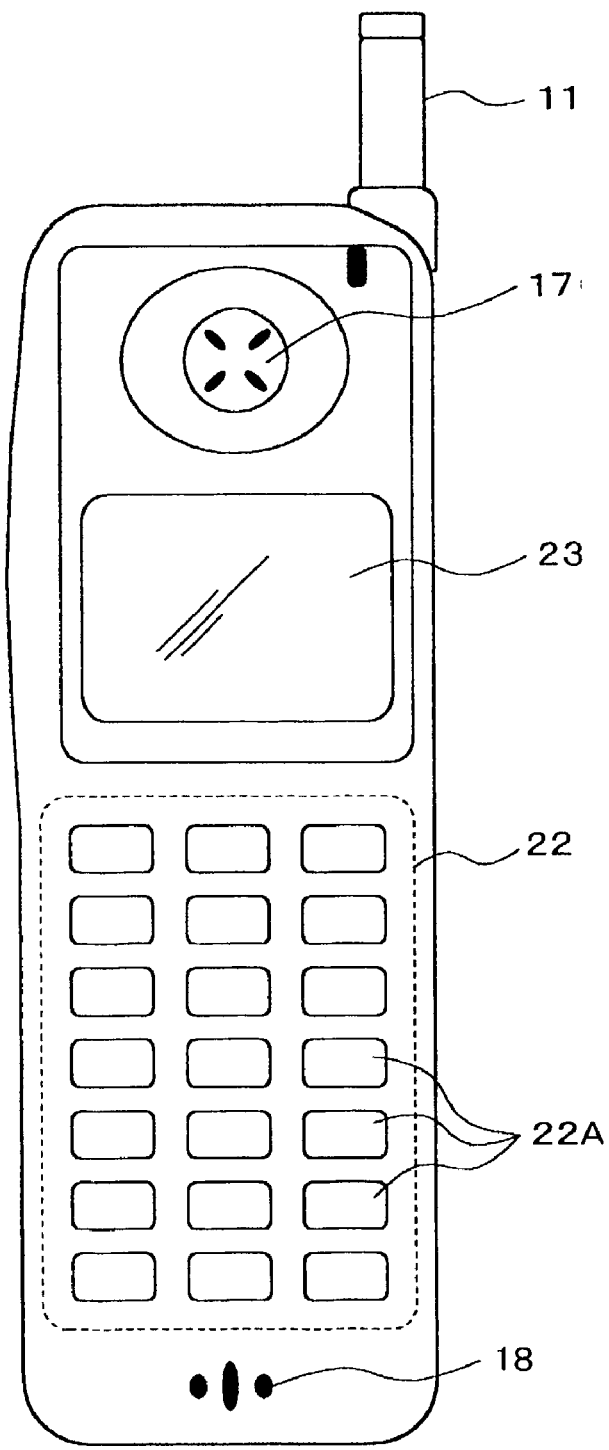
FIG. 3 is a plan view showing the exterior of a cellular phone which is a control device according to the embodiment of the present invention.

FIG. 3 shows the exterior of the cellular phone 1.

On the front section of the main unit of the cellular phone 1 shown in FIG. 3, a microphone 18 serving as a mouthpiece and a speaker 17 serving as an earpiece, are mainly provided, for example, at the positions shown in the figure. Confirmation sound during various operations, and memorized sound are output from another speaker 16 (not shown here).

Furthermore, a display section 23 is disposed below the speaker 17, and various predetermined contents are displayed on the display section in such a manner as to correspond to the operation of the cellular phone 1. For this display section 23, for example, a TFT (Thin-Film Transistor) liquid-crystal display is used.

Furthermore, in a key operation section 22, for example, a predetermined number of operation keys 22A, 22A, . . . , for performing various operations, including the selection of various menus for telephone conversation, character input, searching of Web sites, and communication by bluetooth are disposed. For the operation keys, in addition to button shapes such as those shown in FIG. 3, a so-called jog dial may be provided, and the shapes of operation elements and how to operate them are not particularly limited in this embodiment.

An antenna 11 is mounted in the main unit in such a manner as to expand or contract as is well known, and is provided for transmission and reception of radio waves for telephone conversation.

Figure 4:
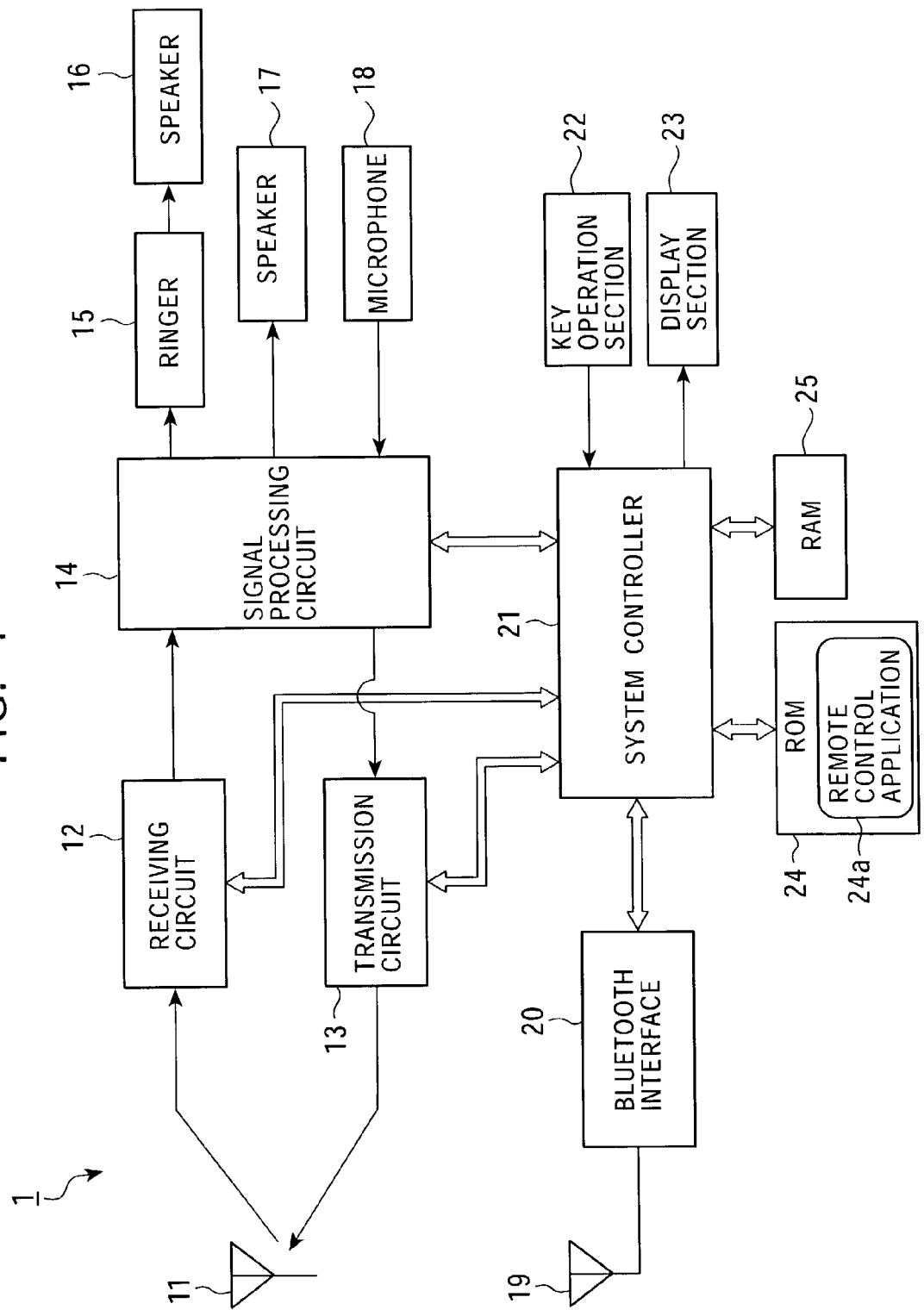
FIG. 4 is a block diagram showing an example of the internal configuration of a cellular phone according to the embodiment of the present invention.

The block diagram of FIG. 4 briefly shows the internal configuration of a cellular phone according to the embodiment of the present invention.

The radio waves received by the antenna 11 are received and demodulated by a receiving circuit 12 and is output to a signal processing circuit 14. If this received radio waves are, for example, audio data of the other party in telephone conversation, the signal processing circuit 14 demodulates the audio data into an audio signal, and outputs it, for example, to the speaker 17. Furthermore, for example, if the received waves are information of so-called data communication, such as mail or the Internet, the signal processing circuit 14 demodulates such communication data. Then, under the control of a system controller 21, this demodulated communication data can be displayed on the display section 23.

Furthermore, for example, when it is necessary to output an electronic beep during operation or a ringing tone during reception, for example, the system controller 21 controls a ringer 15 in order to generate a necessary ringer beep and to cause the speaker 16 to output the audio signal.

Furthermore, for example, the voice of the user, collected by the microphone 18 during telephone conversation, is input as an audio signal to the signal processing circuit 14. The signal processing circuit 14 performs a predetermined encoding process on this audio signal and outputs the signal to a transmission circuit 13. The transmission circuit 13 transmits the signal input from the signal processing circuit 14 via the antenna 11.

The system controller 21 performs various control processes so that various operations are performed by the cellular phone.

This system controller 21 has a ROM 24 and a RAM 25. The ROM 24 is made to be a rewritable memory formed of, for example, flash memory or EEPROM, and programs to be executed by the system controller 21, and display data are stored in this memory. Furthermore, various types of data, for example, telephone directory data, and data of transmitted and received mail, which are set or registered by the user, are stored therein.

In this embodiment, in particular, as will be described later, as a program which needs to be performed by the cellular phone 1 in order to construct the remote control system, the remote-controller application 24*a* is stored.

The RAM 25 stores various types of data which is required for the system controller 21 to perform control processes.

The key operation section 22, as is also shown in FIG. 1, is formed of a predetermined number of operation keys 22A, and outputs an operation information signal corresponding to the operation on these operation keys to the system controller 21. The system controller 21 performs control processes in accordance with this operation information signal so that a predetermined operation can be obtained.

The display section 23, as shown in FIG. 4, is driven to display contents corresponding to the operating status under the control of the system controller 21.

This cellular phone 1 is provided with a bluetooth interface 20 as hardware for realizing the wireless communication function in compliance with the bluetooth standard. The bluetooth interface 20 transmits and receives data in such a manner as to correspond to the control process in accordance with the bluetooth communication program executed by the system controller 21.

The radio waves received by an antenna 19 are demodulated by this bluetooth interface 20, and the received data is extracted. Then, this extracted data is processed by the system controller 21. When data is to be transmitted by bluetooth, the bluetooth interface 20 performs a process, such as packetization, in conformance with bluetooth communication, performs carrier modulation thereon, and sends the data as radio waves under the control of the system controller 21.

2-2. Configuration of Audio Component Device (Device to be Controlled)

Next, with reference to FIG. 5, a description will be given of an example of the internal configuration of the audio component device 2 which is a device to be controlled.

It is assumed that the audio component device 2 in this case has a function for playing back a compact disk (CD), a function for recording/playing back a so-called mini disk (MD), which is a magneto-optical disk, in which audio data is recorded, and a tuner function for receiving and selecting a radio broadcast. In addition, a configuration in which wireless communication is possible using a bluetooth communication network as the communication path 3 is added.

Figure 5:
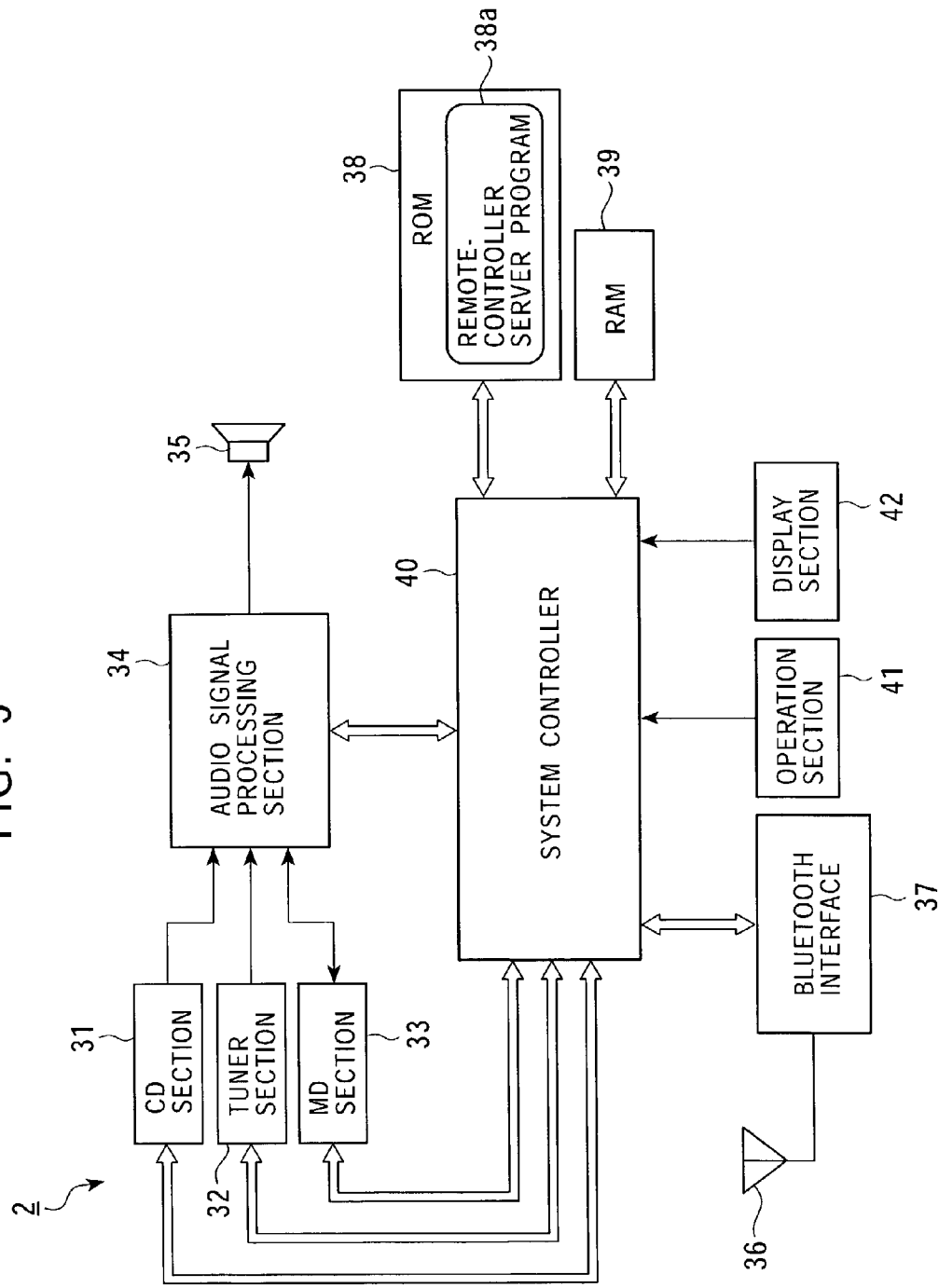
FIG. 5 is a block diagram showing an example of the internal configuration of an audio component device which is a device to be controlled according to the embodiment of the present invention.

As shown in FIG. 5, the audio component device 2 of this embodiment is provided with a CD section 31 in such a manner as to correspond to the CD playback function. Furthermore, a tuner section 32 is provided in such a manner as to correspond to the radio receiving/selection function. Furthermore, an MD section 33 is provided in such a manner as to correspond to the MD recording/playback function.

A CD can be loaded into the CD section 31, and the CD section 31 outputs an audio signal obtained by playing back the loaded CD to an audio signal processing section 34.

The tuner section 32 receives and demodulates radio waves as a radio broadcast in order to obtain an audio signal, and outputs the audio signal to the audio signal processing section 34.

An MD can be loaded into the MD section 33, and audio data can be recorded/played back into or from the loaded MD. During playback of an MD, the audio signal obtained by playing back the MD is output to the audio signal processing section 34.

In a case where audio data is to be recorded, for example, in a case where an audio signal played back by the CD section 31 is to be recorded, the audio signal output from this CD section 31 is input via the audio signal processing section 34 directly in the form of digital data, for example, a required data compression process and a predetermined recording modulation process are performed thereon, and the signal is recorded on the MD.

When an audio signal as radio audio, output from the tuner section 32 is to be recorded, an audio signal as an analog signal output from the tuner section 32 is input via the audio signal processing section 34, and after the signal is converted into digital audio data, the data compression process and the recording modulation process, which are the same as those described above, are performed thereon, and the signal is recorded on the MD.

The audio signal processing section 34 inputs an audio signal output from the CD section 31, the tuner section 32, and the MD section 33 in the above-described manner, performs a predetermined audio signal process thereon, and can output the signal finally from a speaker 35.

As also described above, when an audio signal such as CD playback audio or radio audio, received by the tuner section 32, is recorded in the MD section 33, the audio signal processing section 34 also operates so that the audio signal input from the CD section 31 or the tuner section 32 is input to the MD section 33.

The system controller 40 is provided to control the operation of each section in the audio component device 2.

The ROM 39 is made to be a rewritable memory formed of, for example, flash memory or an EEPROM, and various programs to be executed by the system controller 40, various setting information set by the user, etc., are stored therein. In this embodiment, in particular, a remote-controller server program 38*a*, which is a program for the audio component device 2 to perform an operation as a device to be controlled in the remote control system, is stored.

The operation section 41, provided, for example, in the main unit of the audio component device 2, comprises various operation elements for the user to operate the audio component device 2, and an operation information output section for generating operation information corresponding to the operation performed on this operation element and outputting the operation information. The system controller 40 performs a predetermined control process so that an operation corresponding to the operation information output from the operation section 41 is performed.

On the display section 42, predetermined contents corresponding to the operation of the audio component device 2 are displayed. For example, when a CD is being played back by the CD section 31, a display showing a playback track and a playback time is performed.

An antenna 36 and a bluetooth interface 37 are provided as hardware for realizing the bluetooth communication function. The operation of the bluetooth interface 37 is the same as that of the bluetooth interface 20 described above with reference to FIG. 4, and accordingly, a description thereof is omitted here.

2-3. Conversion-Into-Remote-Controller Process

In a system, having the above-described configuration, comprising the cellular phone 1 serving as a control device and the audio component device 2 serving as a device to be controlled, as will be described below, a predetermined processing operation involving a communication process via the communication path 3 (bluetooth communication network) is performed. As a result, in response to the operation of the user on the cellular phone 1, it is possible to remotely control the audio component device 2.

Here, the processes of the system of this embodiment are broadly classified into a conversion-into-remote-controller process and a remote-control performing process performed after this conversion-into-remote-controller process.

The conversion-into-remote-controller process is a processing sequence performed by the control device and the device to be controlled in cooperation in order that an electronic device serving as a control device is made to function as a remote controller capable of controlling a specific device to be controlled.

The remote-control performing process is a processing sequence performed by the control device and the device to be controlled in order to actually control the device to be controlled in response to the operation performed on the control device provided with a function as a remote controller for a specific device to be controlled.

Accordingly, the conversion-into-remote-controller process will be described first.

Figure 6:
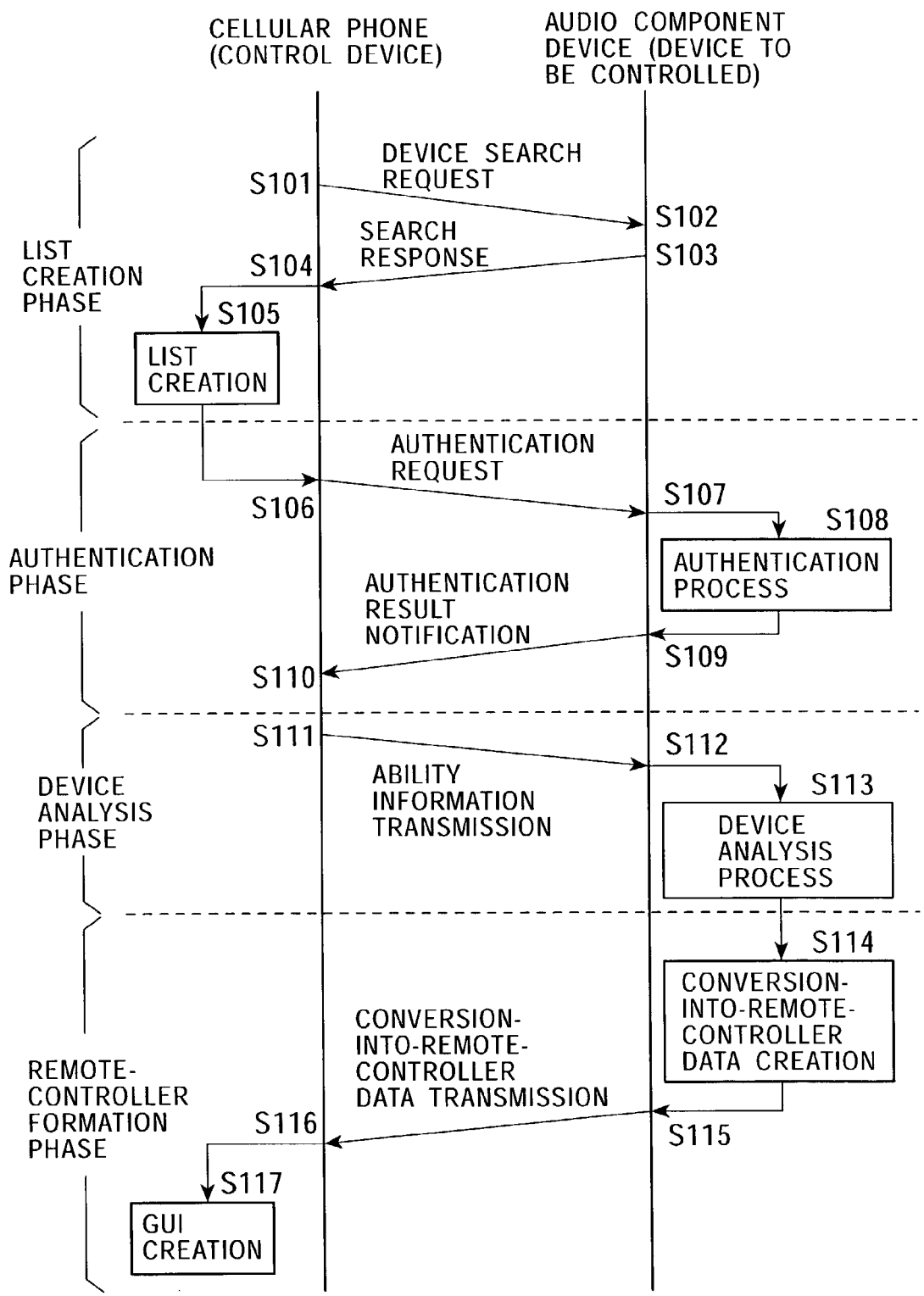
FIG. 6 is a process transition view showing a conversion-into-remote-controller process according to the embodiment of the present invention.

FIG. 6 shows the flow of a conversion-into-remote-controller process performed by the cellular phone 1, which is a control device, and an audio component device 2, which is a device to be controlled. The processes on the cellular phone 1 (control device) side are performed by the system controller 21 in accordance with the program of the remote-controller application 24*a*, and the processes on the audio component device 2 (device to be controlled) side are performed by the system controller 40 in accordance with the remote-controller server program 38*a*.

In the conversion-into-remote-controller process to be described next and the remote-control performing process to be described later, it is assumed that the communication path 3 which exists between the cellular phone 1 (control device) and the audio component device 2 (device to be controlled) is a bluetooth communication network. That is, wireless communication performed between the cellular phone 1 and the audio component device 2 uses a bluetooth communication function possessed by each of them.

Then, the conversion-into-remote-controller process is performed in accordance with the processing flow shown in FIG. 6 in the following sequence: (1) list creation phase, (2) authentication phase, (3) device analysis phase, and (4) remote-controller formation phase. A description will now be given for each phase.

(1) List Creation Phase

In this case, in the cellular phone 1, which is a control device, first, a device which can be communicated by a bluetooth communication network is searched for, and a list of devices in a state in which communication is possible is created. As a result of later processes, a device to be controlled is selected from among those devices in which communication is possible. For this list creation phase, the processes on the device to be controlled side (steps S102 and S103) are performed not only by the audio component device 2, but also by another device in a state in which communication by bluetooth is possible.

In order to create a list, the cellular phone 1 (control device) generates a device search request in step S101. On the device to be controlled side including the audio component device 2, when the device search request is received in step S102, a response process is performed in step S103. Furthermore, on the cellular phone 1 (control device) side, this response is received in step S104.

In practice, these steps S101 to S104 are formed by transactions such as those described below.

For example, first, after the cellular phone 1 is assumed to be a master and the device to be controlled is assumed to be as a slave, a transaction for achieving synchronization between the frequency axis and the time axis between the master and the slave, that is, for establishing synchronization in order to allow communication by bluetooth is performed on a device as a bluetooth device which is assumed to be present in the surroundings. Then, after synchronization is established, for example, a transaction for obtaining the bluetooth device name for each slave (here, this serves as a device to be controlled), information of a profile possessed by each bluetooth device, etc., is performed.

Then, at the stage when the search processes (steps S101 to S104) are terminated in the above-described manner, in the cellular phone 1 which is a control device, information on devices (bluetooth devices) in which communication is currently possible by bluetooth has been obtained. Therefore, in the cellular phone 1, a list of devices in which bluetooth communication is possible is created as shown in the process of step S105.

The contents of the list created as a result of this process of step S105 are displayed on the display section 23 of the cellular phone 1. An example of this display is shown in FIG. 8.

Figure 8:
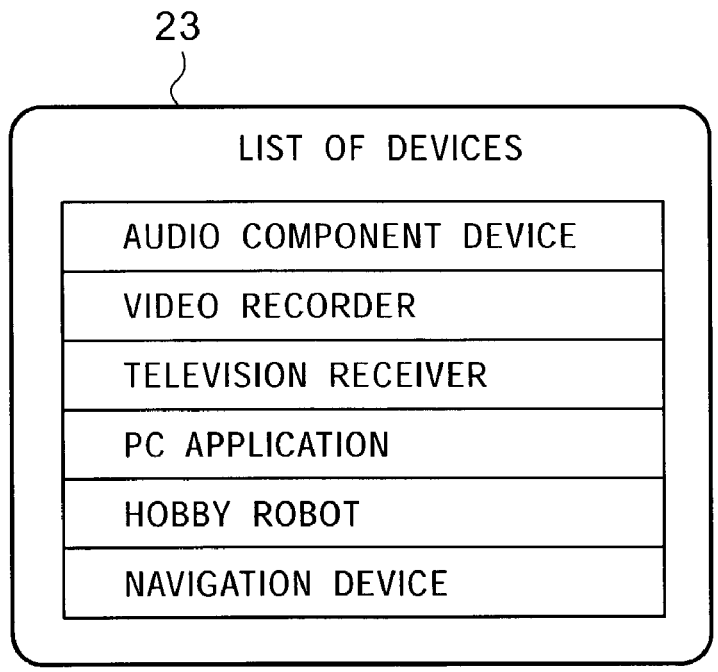
FIG. 8 is an illustration of an example of a display form of a list of devices, which is displayed on the display section of a cellular phone according to the embodiment of the present invention.

In FIG. 8, a list of devices which can be currently connected by bluetooth is shown under the title of the "list of devices".

Here, within the display frame as a list, an "audio component device", a "video recorder", a "television receiver", a "PC application", a "hobby robot", and a "navigation device" are shown from the top toward the bottom, and it is shown that these devices (bluetooth devices) and the cellular phone 1 can communicate with each other.

This list display functions as a GUI, and by the user performing a predetermined operation on this list display, a device to be remotely controlled by the cellular phone 1 can be selected from the list of devices. Then, when the operation for selecting and determining a device for the target of remote control is performed, the process proceeds to the next authentication phase. Here, it is assumed that the user has selected the audio component device 2 as a control target device.

Forms of such a list display can be conceived in various ways, and the display is not limited to that shown in FIG. 8. For example, in the bluetooth communication standard, bluetooth device names can be set as desired by the user, and a list display may be performed by these bluetooth device names.

(2) Authentication Phase

Here, the remote control system of this embodiment is constructed in such a manner that, when the control device side controls the device to be controlled, authentication from the device to be controlled side is required. As a result, a remote control operation cannot be performed from any user, so that protection for the user is ensured.

For this purpose, for example, for the device to be controlled, authentication information made up of predetermined user identification information, such as a user ID, a password set by the user, etc., is registered in advance by a registration operation. In addition, processes as an authentication phase to be described below are performed.

In the authentication phase, first, in the process of step S106, an authentication request is made from the cellular phone 1 which is a control device to the device to be controlled. At this time, the user operates the cellular phone 1 in order to input predetermined authentication information, such as the above-described user TD and password, and then transmits this authentication information. The transmission of this authentication information becomes the authentication request described above.

In the audio component device 2 as a device to be controlled, when the authentication request is received in the process of step S107, an authentication process is performed in step S108. In this authentication process, the authentication information received as an authentication request is compared with the authentication information registered in the audio component device 2, and the authentication result is thereby obtained. Then, in the process of step S109, the information of the authentication result is transmitted to the cellular phone 1.

The cellular phone 1 receives the information of the authentication result in step S110.

Here, if the contents of the received authentication result indicate the establishment of authentication, it follows that the audio component device 2 (device to be controlled) has permitted remote control. In this case, the cellular phone 1 can proceed to the next device analysis phase.

When an authentication request is made to the device to be controlled in which no authentication information is registered, the information of the authentication result as the authentication being not established is received, and in this case, the subsequent processing sequence is not performed.

(3) Device Analysis Phase

The device analysis phase is made up of a processing sequence for performing an analysis process required for the device to be controlled to cause the control device to function as a remote controller, and this sequence is performed in the following manner.

When authentication is established in the above-described manner, the cellular phone 1, which is a control device, transmits ability information to the audio component device 2, which is a device to be controlled, in the process of step S111.

This ability information is information indicating the ability regarding the input operation, possessed by the cellular phone 1. In this case, examples of information on operation elements include the type of operation element, information indicating a number, and the size information of the number of pixels of the LCD of the display section 23 used for GUI operation. If such information contents are considered together, it is possible to understand the ability of the input operation function as the cellular phone 1.

When the audio component device 2 receives the ability information in the process of step S112, the device analysis process is performed in the process of step S113.

As the device analysis process here, by analyzing the contents of the received ability information, the ability as to the input operation function of the cellular phone 1 is recognized. Then, when this recognition result is obtained, the process proceeds to the process of step S114 in the next remote-controller formation phase.

(4) Remote-Controller Formation Phase

In this remote-controller formation phase, first, the audio component device 2 performs the process of step S114. Step S114 is a process for creating conversion-into-remote-controller data on the basis of the analysis result in step S113 described above.

As described above, as a result of the analysis process in step S113, the ability of the input operation function of the cellular phone 1 is recognized. Then, in step S114, application data for forming a GUI which can be realized by the cellular phone 1 within the range of this recognized ability is created. This is the conversion-into-remote-controller data.

For example, in this case, since the device to be controlled is an audio component device, a button image for operating this audio component device, control information for layout for displaying this button image on the display section, and information for defining how to operate the button image are incorporated to form application data. At this time, for example, the size and the layout of the button image are determined according to the size of the display section 23 of the cellular phone 1.

As can be understood from the description thus far, since the conversion-into-remote-controller data created in the above-described manner depends on the result in which the ability information is analyzed, the data is different as appropriate according to the ability information. That is, this means that the conversion-into-remote-controller information is created in such a manner as to adapt to the ability of the input operation function of the control device. For example, in the cellular phone 1, the display area in the display section 23 is not very large. However, the operation keys have a comparatively large number of operation elements, such as numeral keys corresponding to a dial, and, furthermore, have a character input function in such a manner as to correspond to, for example, the telephone directory and the mail function. Therefore, after, for example, the GUI image to be displayed on the display section 23 is made simple in such a manner as to conform to the ability of such an input operation function, conversion-into-remote-controller data is created for forming a GUI through which predetermined operations can be realized by various operations on operation elements.

Furthermore, if the control device is a PDA, generally, in a PDA, since a touch operation can be performed on the display section with a touch panel, conversion-into-remote-controller data by which a GUI corresponding to such a touch panel operation is realized is created.

The conversion-into-remote-controller data created in the above-described manner is transmitted to the cellular phone 1 in the process of step S115. The cellular phone 1 receives this conversion-into-remote-controller data in the process of step S116.

Then, in the cellular phone 1, in the process of step S117, by using the received conversion-into-remote-controller data, a GUI used for an operation for remotely controlling the audio component device 2 is created.

In the GUI creation process in this case, for example, if the conversion-into-remote-controller data is content data created by XML (Extensible Markup Language) or HTML (Hyper Text Markup Language), a file of these contents may be reproduced.

If the conversion-into-remote-controller data is data written by a program language, such as a Java applet, this Java applet may be performed. Then, in order to realize such a GUT creation process, for example, as the remote-controller application 24*a* on the control device side, predetermined content data may be played back or software for executing Java may be installed.

Figure 9:
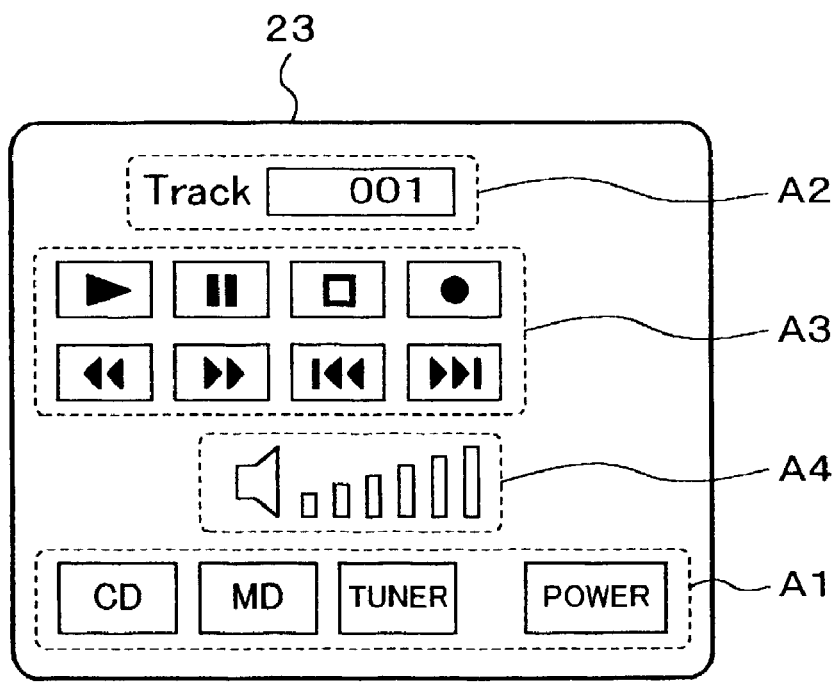
FIG. 9 is an illustration of an example of a display form of a GUT screen for operating an audio component device, which is displayed on the display section of a cellular phone according to the embodiment of the present invention.

As a result of a GUI being created by the process of step S117 described above, a GUI image is displayed on the display section 23 of the cellular phone 1. An example of the display form of this GUI image is shown in FIG. 9.

In this case, since the device to be controlled is the audio component device 2, a GUI image for allowing an operation for the audio component device 2 is displayed. In this case, as shown in, for example, FIG. 9, the GUI image is an area in which a function button area A1, a track selection area A2, a recording/playback operation button area A3, a volume adjustment area A4, etc., are shown.

In the function button area A1, mainly, buttons for selecting a function (CD/MD/tuner switching) in the audio component device 2, and a power button as a power key are provided.

The track selection area A2 is an area for performing an operation for selecting a track to be played back when, for example, a CD or an MD is to be played back, and by inputting a numeral by a predetermined operation, the track number of the playback track can be specified.

The recording/playback operation button area A3 is formed of various buttons used to play back a CD and to record/play back an MD. By appropriately operating buttons displayed in this area, it is possible to control operations, such as disk playback, pause, stop, fast forwarding/rewinding, finding the beginning, and MD recording.

The volume adjustment area A4 is an area for adjusting a sound volume.

In this manner, in the display section 23, at the stage when the GUI image for operating the audio component device 2 is displayed, the cellular phone 1 is provided with a function as a remote controller which remotely controls the audio component device 2.

From then on, for example, as a result of the user operating a predetermined operation element provided in the main unit of the cellular phone 1, it is possible to perform an operation on the GUI image which is displayed in the above-described manner.

For example, if the user selects the button of "CD" in the function button area A1 by operating a predetermined operation element of the cellular phone 1, the CD section is selected as the function. Next, if an operation which is equivalent to operating the playback button of the recording/playback operation button area A3 by an operation on a predetermined operation element of the cellular phone 1 is performed, playback of the CD is started in the audio component device 2.

2-4. Remote-Control Performing Process

In the manner described above, after the sequence of the conversion-into-remote-controller process is performed, the control device functions as a remote controller for a specific device to be controlled. Therefore, next, a description will now be given of remote-control performing processes, which are a process on the control device side and a process on the device to be controlled at this time. The processing sequence of this remote-control process is shown in FIG. 7.

Figure 7:
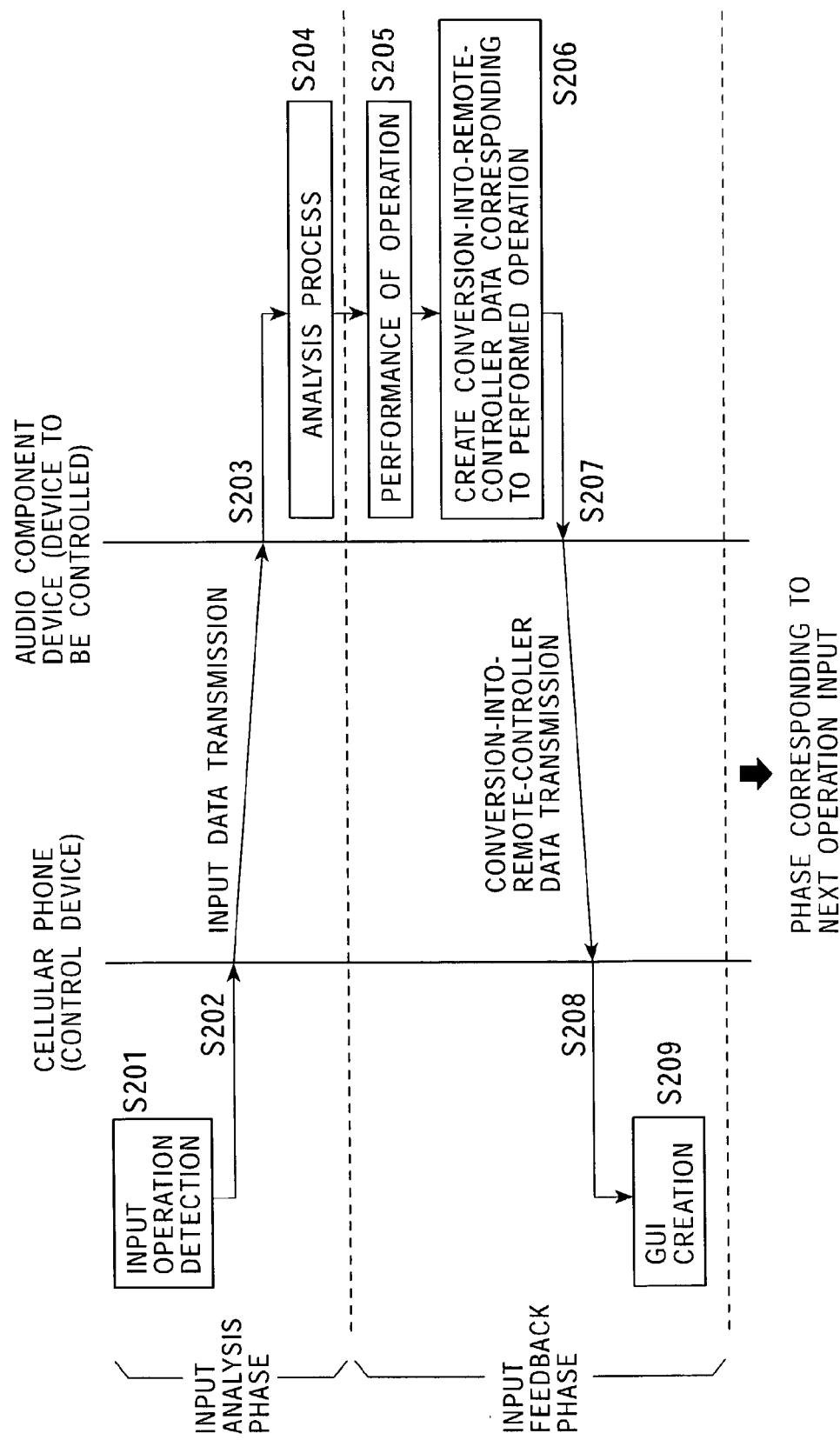
FIG. 7 is a process transition view showing a remote-control performing process according to the embodiment of the present invention.

As shown in FIG. 7, the remote-control performing process is performed in the following sequence: (1) input analysis phase and (2) input feedback phase.

(1) Input Analysis Phase

It is assumed that, on the cellular phone 1 side as a control device, some kind of operation is performed on the GUI image shown in, for example, FIG. 9. Just then, the cellular phone 1 performs a process for detecting an input operation in step S201. As a result of this process, input data corresponding to the operation is created. Then, in the process of the next step S202, this input data is transmitted to the audio component device 2 which is a device to be controlled. The input data referred to herein, as, for example, an operation input information, may be a code signal corresponding to a key which is simply operated, may be an operation signal, which has not been subjected to, in particular, compiling, or may be data which is converted into a command format, which can be processed on the device to be controlled side, by a program as a GUI, for example, in such a manner as to correspond to an input operation.

The input data transmission process in step S202 may be performed each time an operation input is performed. Alternatively, input data obtained by a plurality of operation inputs may be stored, and this data may be transmitted at a predetermined timing.

The input data transmitted in the above-described manner is received by the audio component device 2, which is a device to be controlled, in the process of step S203. Then, in step S204, the audio component device 2 performs a process for analyzing the received input data. As a result of this analysis process, the audio component device 2 recognizes what kind of operation needs to be performed in such a manner as to correspond to the received input data. Thereafter, the process proceeds to the input feedback phase.

(2) Input Feedback Phase

In this input feedback phase, first, on the audio component device 2, which is a device to be controlled, the process of step S205 is performed.

In this process of step S205, the system controller 40 performs a predetermined control process in the audio component device 2 so that an operation, recognized by the analysis process of step S204 described above, which needs to be performed by the audio component device 2, is obtained. For example, when the recognition that a CD needs to be played back is obtained as the analysis process result in step S204, a control process for the CD section 31 is performed so that the CD loaded into the CD section 31 is played back.

If the operation is performed in the manner described above, on the audio component device 2 side, the process proceeds to the process of the next step S206 and subsequent steps.

Since the display section 23 of the cellular phone 1 is not very large, it is difficult to display a GUI image for realizing the operations corresponding to all the functions of the audio component device 2. Therefore, in this embodiment, when a new GUI becomes necessary in such a manner as to correspond to some kind of operation, this conversion-into-remote-controller data is created and transmitted, and the new GUI is formed on the control device side. This is the process of step S206 and subsequent steps.

The process of step S206 and subsequent steps will now be described by using a specific example such as that described below.

It is assumed that, as an operation on the GUI image of the cellular phone 1 shown in, for example, FIG. 9, an operation for the [TUNER] button in the function button area A1 is performed. As a result of the audio component device 2 analyzing the input data transmitted in response to this operation, in the process of step S205, a control process for switching the function to the tuner (radio) is performed.

Here, if the function has been switched to the tuner, from then on, for example, an operation for switching the AM/FM band and a selection operation for selecting a desired broadcasting station must become possible. However, on the GUI image shown in FIG. 9, no buttons by which an operation is possible under such a tuner function are provided at all. In this embodiment, the GUI image corresponding to the function of the tuner is obtained as a result of the process of step S206 and subsequent steps being performed in the following manner.

After the function is switched to the tuner in the process of step S205 in the above-described manner, in the process of step S206, conversion-into-remote-controller data for the GUI corresponding to the function of the tuner is created. That is, conversion-into-remote-controller data having information contents for allowing the band switching and a station selection such as those described above is newly created. Then, in the process of step S207, this conversion-into-remote-controller data is transmitted.

Then, in step S208, the cellular phone 1 receives the conversion-into-remote-controller data. Then, in the process of the next step S209, by using this received conversion-into-remote-controller data, a new GUI is created. As a result this GUI being created, although the illustration is omitted, on the display section 23, the display is switched from the GUI image shown in FIG. 9 to the display of the GUI image from which an operation for the tuner function is possible.

In this manner, in the input feedback phase, the device to be controlled performs an operation corresponding to the remote control operation performed by the user, and a GUI which becomes necessary next in response to this operation is formed.

Then, from then on, each time the user performs a remote control operation on the cellular phone 1, a processing sequence composed of (1) input analysis phase and (2) input feedback phase described above is repeatedly performed. As a result, the function for remotely controlling the audio component device 2 by the operation on the cellular phone 1 is realized.

As has thus been described, as a result of the conversion-into-remote-controller process and the remote-control performing process, shown in FIGS. 6 and 7, being performed, the remote control system in which the cellular phone 1 is used as a control device and the audio component device 2 is used as a device to be controlled is constructed.

For example, in a system including a device which functions as a relay, which has been available conventionally, the user interface on the control device side does not change even if any type of device is a control target, and remote control is realized by the form in which the relay performs command conversion according to the device to be controlled.

In contrast, in the case of the remote control system of this embodiment, it may be said that the device to be controlled provides a user interface for remote control according to the ability of the input operation notified by the control device. Even if there is no device as a relay, remote control is possible by the control device and the device to be controlled performing communication in a direct manner. That is, the remote control system in a simple form in which no relay is required is provided.

Furthermore, in this embodiment, since devices can be made to function as control devices and devices to be controlled by providing the function for connection to the communication path 3 and by providing the remote-controller application 24a or the remote-controller server program 38a corresponding to the type of device, etc., various types of electronic devices can be made to serve as control devices and devices to be controlled.

Furthermore, the contents of the conversion-into-remote-controller data created by the device to be controlled are changed adaptively according to the ability of the input operation function of the control device. This means that the device can be made to function as a remote controller in which the ability of the control device is utilized. For example, even if the device is not a dedicated remote controller, a satisfactory ease of operation can be provided.

With such an arrangement of this embodiment, for example, in a company in which various types of electronic devices are manufactured, by providing the electronic devices with the conversion-into-remote-controller data as a function common to the products of that company, it becomes easy to provide a so-called total solution, and the convenience of the user who uses products of that company can be improved. Furthermore, since the communication path 3 between the control device and the device to be controlled can be formed as a network, such as the Internet or a LAN, it may be said that compatibility is high when the device is used in an environment, such as network communication by, for example, TPv6, broadband, or always-on connection.

A description will now be given for confirmation. The processing sequence of the conversion-into-remote-controller process and the remote-control performing process shown in FIGS. 6 and 7 described above is not applied to only the case in which the control device is made to be the cellular phone 1 and the device to be controlled is made to be the audio component device 2, but may be applied to a combination of other types of control devices and devices to be controlled.

For example, even when the electronic device serving as a device to be controlled is not originally provided with a timer function, if data for generating a GUI which realizes a timer function is written as conversion-into-remote-controller data, it becomes possible to cause the device to be controlled to perform an operation in accordance with the timer setting by control from the control device.

More specifically, on the control device side, the timer time is set in advance by an operation on the GUI, and if the set time is reached, predetermined input data is transmitted from the control device. The device to be controlled performs an operation in accordance with this input data. Alternatively, software is structured in such a manner that control information containing the timer time set by the control device is transmitted in advance as input data, and the device to be controlled can perform a specified operation at the timer time indicated by the control information. As a result of the above, it is possible to cause the device to be controlled to behave as if it operates in accordance with the timer setting.

Furthermore, if a GUI is formed in which a conversion-into-remote-controller process sequence is performed between one control device and a plurality of devices to be controlled so as to be able to operate the plurality of these devices to be controlled in an integrated manner, and if an operation on this GUI is performed, it is possible to cause a plurality of devices to be controlled which are not originally constructed to perform a coordinated operation to perform some kind of system-related coordinated operation. For example, by controlling both a single CD player and a single MD recorder/player, which are not combined as a system, as devices to be controlled, it is possible to synchronize a dubbing operation.

The list creation phase described with reference to FIG. 6 is not necessarily required in the present invention. That is, the list creation phase shown in FIG. 6 described above is a processing sequence in which a device which can become a control target is dynamically selected by searching for a device which can be communicated via the communication path 3. In addition to such processing, it is possible to form devices which can become control targets into a list. For example, devices which can be communicated, which have already been registered in the control device, may be shown as a list. Furthermore, the creation of a list and displaying it may be omitted, and after an operation for specifying a particular device as a device to be controlled is performed, the process may proceed to the subsequent authentication phase.

In FIG. 6, the list creation phase and the authentication phase which follows are shown as processes which are performed at different timings. Alternatively, at the stage when the control device communicates with the device to be controlled in order to create a list, processes corresponding to the authentication phase may be performed. Furthermore, the authentication phase itself is not necessarily required, and, in practice, this may be omitted.

What is claimed is:

1. A remote control system comprising: a control device; and
   a device to be controlled, which can communicate with the control device via a communication path,
   wherein said control device comprises:
   input operation means comprising one or more input operation elements for performing input operations;
   ability information transmission means for transmitting input ability information comprising available input operation elements and at least information regarding the type of each element to said device to be controlled;
   user interface forming means for forming a user interface used to operate said device to be controlled by using conversion-into-remote-controller information transmitted by said device to be controlled in response to the reception of said input ability information; and
   operation information transmission means for transmitting operation information corresponding to an operation performed on one or more of said input operation elements to said device to be controlled, and
   wherein said device to be controlled comprises:
   conversion-into-remote-controller information creation means for creating, on the basis of said received input ability information, said conversion-into-remote-controller information defining mappings between elements of said user interface and operational aspects of the device to be controlled;
   conversion-into-remote-controller information transmission means for transmitting said conversion-into-remote-controller information to said control device; and
   operation control means for performing an operation in accordance with said received operation information.

2. A remote control system according to claim 1, wherein said conversion-into-remote-controller information transmission means of said device to be controlled creates new conversion-into-remote-controller information as a result of the operation performed by said operation control means.

3. A remote control system according to claim 1, wherein said control device further comprises search means for searching for a device, to be controlled via said communication path.

4. A remote control system according to claim 1, wherein said control device further comprises:
   authentication information transmission means for transmitting authentication information to said device to be controlled; and
   operation control means for performing operation control based on the authentication result information received via said communication path, and wherein said device to be controlled further comprises:
   authentication processing means for performing an authentication process for determining whether to allow said control device to control said device to be controlled in response to the reception of said authentication information; and
   authentication result information transmission means for transmitting said authentication result information obtained by said authentication processing means to said control device.

5. An electronic device comprising:
   communication means capable of communicating with an electronic device to be controlled via a communication path;
   input operation means comprising one or more input operation elements for performing input operations;
   ability information transmission means for transmitting, by using said communication means, input ability information comprising available input operation elements and at least information regarding the type of each element to said device to be controlled;
   user interface forming means for forming a user interface used to operate said device to be controlled by using conversion-into-remote-controller information transmitted by said device to be controlled in response to the reception of said input ability information, said conversion-into-remote-controller information defining mappings between elements of said user interface and operational aspects of the device to be controlled, and
   operation information transmission means for transmitting, by using said communication means, operation information corresponding to an operation performed on one or more of said input operation elements to said device to be controlled.

6. An electronic device according to claim 5, further comprising search means for searching for an electronic device to be controlled via said communication path.

7. An electronic device according to claim 5, further comprising:
   authentication information transmission means for transmitting, to an electronic device to be controlled, authentication information used by said electronic device to be controlled for an authentication process for determining whether to allow the electronic device to control it; and
   operation control means for performing operation control based on the authentication result information transmitted from said device to be controlled which has performed an authentication process on the basis of said authentication information.

8. A program embodied on an electronic readable medium for causing an electronic device to execute:
   a communication step in which communication with an electronic device to be controlled, which is a control target, via a communication path, is established;
   an ability information transmission step in which input ability information comprising the available input operation elements possessed by the electronic device and at least information regarding the type of each element is transmitted to said device to be controlled;
   a user interface forming step of forming a user interface which is used to operate said device to be controlled by using conversion-into-remote-controller information transmitted by said device to be controlled in response to the reception of said ability information, for forming a user interface which can be operated within the input ability range of said electronic device; and an operation information transmission step of transmitting operation information corresponding to an input operation performed on said input operation elements.

9. An electronic device comprising:

communication means capable of communicating with a controlling electronic device for which said electronic device is a control target via a communication path;

conversion-into-remote-controller information creation means for creating conversion-into-remote-controller information for use in forming a user interface in accordance with ability information received from the controlling electronic device indicating available input elements and including at least information regarding the type of each element;

conversion-into-remote-controller information transmission means for transmitting said conversion-into-remote-controller information to said controlling electronic device using said communication means; and operation control means for performing an operation in said electronic device corresponding to operation information transmitted by said controlling electronic device in response to an input operation performed on said input elements.

10. An electronic device according to claim 9, wherein said conversion-into-remote-controller information transmission means creates new conversion-into-remote-controller information as a result of the operation performed by said operation control means.

11. An electronic device according to claim 9, further comprising:

authentication processing means for performing an authentication process for determining whether to allow the controlling electronic device to control it by using authentication information transmitted from said controlling electronic device; and authentication result information transmission means for transmitting authentication result information obtained by said authentication processing means to said controlling electronic device by using said communication means.

12. A program embodied on an electronic readable medium for causing an electronic device to execute:

a communication step in which communication with a controlling electronic device is established via a communication path;

a conversion-into-remote-controller information creation step for creating conversion-into-remote-control information for forming a user interface in accordance with ability information received from the controlling electronic device indicating available input elements and including at least information regarding the type of each element a conversion-into-remote-controller information transmission step of transmitting said conversion-into-remote-controller information to said controlling electronic device; and an operation control step of performing an operation corresponding to operation information transmitted by said controlling electronic device in response to an input operation performed on one or more of said input elements under the user interface formed using said conversion-into-remote-controller information.

13. A method of controlling an electronic device utilizing a control device comprising:

transmitting input ability information including at least information regarding the type of each input element available from said control device to said electronic device, and wherein the electronic device forms mappings between the input ability of the control device and the functionality of the electronic device, and wherein the mappings are then transmitted to the control device in the creation of a user interface.

* * * * *